United States Patent [19]

Komatsubara et al.

[11] Patent Number: 4,467,377
[45] Date of Patent: Aug. 21, 1984

[54] CASSETTE TYPE-TAPE RECORDER

[75] Inventors: Masahiro Komatsubara; Tetsuro Kamimura; Takugi Inanaga; Akira Takahashi, all of Saitama, Japan

[73] Assignee: Pioneer Electronic Corporation, Tokyo, Japan

[21] Appl. No.: 335,319

[22] Filed: Dec. 29, 1981

[30] Foreign Application Priority Data

Dec. 29, 1980 [JP] Japan .................... 55-187928[U]

[51] Int. Cl.³ .............................................. G11B 15/00
[52] U.S. Cl. .................................... 360/96.1; 360/132
[58] Field of Search ............ 360/96.1, 132, 96.2–96.4; 242/199

[56] References Cited

U.S. PATENT DOCUMENTS 4,062,506 12/1977 Machida ........................ 360/132 X Primary Examiner—John H. Wolff
Attorney, Agent, or Firm—Sughrue, Mion, Zinn, Macpeak and Seas

[57] ABSTRACT

A cassette machine is provided with a central roller for contacting the tape and a pair of magnetic heads on either side of the additional roller and employed in accordance with the direction of tape travel, so that the head-tape contact point is always isolated form the supply reel by the additional roller.

5 Claims, 15 Drawing Figures

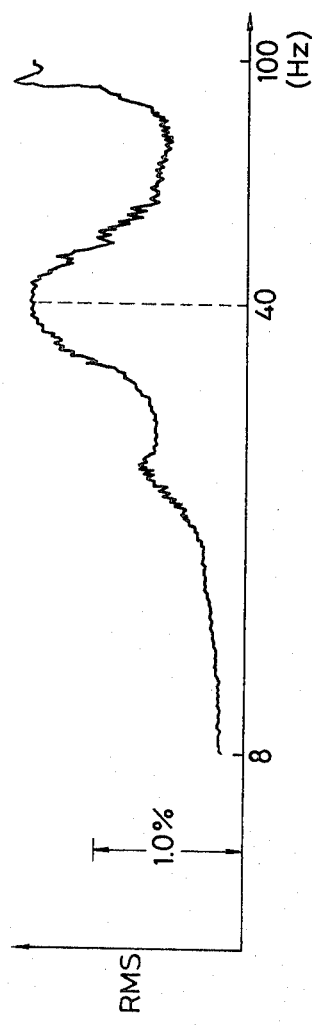
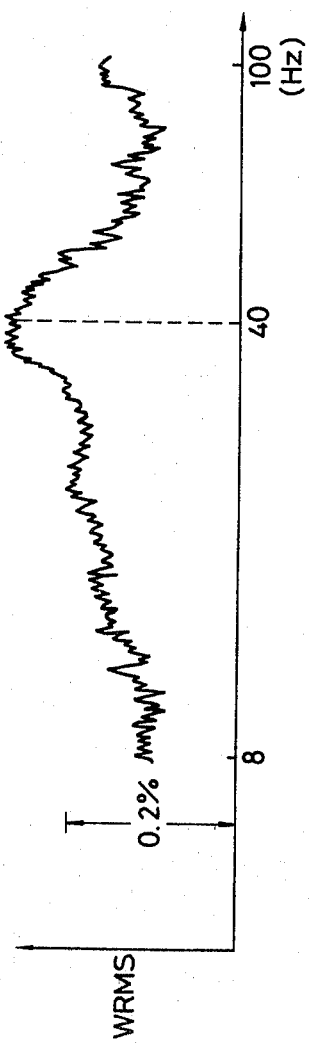

CASSETTE TYPE-TAPE RECORDER

BACKGROUND OF THE INVENTION

The present invention relates to a cassette tape recorder for automatic stereo sets.

It is well known from experience that an ordinary cassette tape recorder may produce a high quality sound when a vehicle in which the cassette tape recorder is installed is in a stationary condition but that the same tape recorder may produce a poor quality sound when the vehicle is in motion and is experiencing large up-and-down vibrations. It is also known that, particularly when the remainder of tape to be played is large, wow is increased to thereby result in a poor quality sound production.

Various studies of this wow phenomenon have been made by the present invention. In one experiment, an up-and-down vibration of 1 G was applied to an ordinary cassette tape recorder at a changing frequency, and the resulting wow was measured. The results are shown in FIG. 1, which is a graph showing the wow (RMS) characteristics vs. frequency. As is apparent from the characteristic curve, wow exceeding 1% was generated at vibrations of 40 Hz and also at 100 Hz or more. These characteristics were measured in another way, that is, in an auditory sense compensation, and the results were as shown in FIG. 2. The wow generated at the vibration of 100 Hz or more was less than 0.2% and caused no problem, but the wow generated at about 40 Hz was still more than 0.2%, which caused the quality of sound to be degraded.

Detailed analyses of the wow at 40 Hz were then made, which can be understood with reference to the structures of a conventional tape recorder and the tape cassette and operations thereof as will be explained in detail with reference to FIGS. 3 through 8.

Referring first to FIGS. 3 and 4, a tape cassette case generally designated by reference numeral 1 is made up of cassette halves 1a and 1b and a tape 2 encased therein. The tape 2 is fixed at either end to a pair of reels 3a and 3b by means of respective clampers 4a and 4b, so that the tape can be wound onto the reels 3a and 3b. Thus, when the winding diameter of tape on one side is increased, the winding diameter of tape on the other side is decreased. In the drawings, the tape is fully wound on supply reel 3b. It is a typical feature of the tape cassette that no flanges are provided on the reels 3a and 3b, to thereby decrease the distance between reels 3a and 3b, which in turn leads to a miniaturization of the overall physical cassette size. However, without flange members, the tape may be wound on the reels 3a and 3b non-uniformly in a width wise direction. In order to eliminate this defect, i.e., to prevent the tape from contacting with the inner walls of the cassette halves 1a and 1b, and in order to achieve such prevention without causing any substantial additional friction, a space is provided between the tape and each inner wall of the cassette halves 1a and 1b, and a sheet 5a or 5b which is a so called "retainer" is interposed in this space so that the reels 3a and 3b are retained at a suitable position within the case 1.

A pair of guide rollers 6a and 6b, a pressure pad 7, and the like are encased in the case together with the tape 2 and the reels 3a and 3b. In the walls of the case 1 are formed a pair of capstan shaft insertion holes 8a and 8b, positioning pin insertion holes 9a, 9b, 9c and 9d, a pair of pinch roller insertion holes 10a and 10b, reel shaft insertion holes 11a and 11b, and a magnetic head insertion hole 12. Reference characters 3a' and 3b' denote engagement lips formed at an angular interval of 60° on the circumferential periphery of the reel 3a or 3b.

On the other hand, the cassette tape recorder comprises a pair of reel shafts 20a and 20b, a capstan shaft 21, a pinch roller 23 and a magnetic head 24. When the tape cassette 1 is mounted on the tape recorder, the reel shafts 20a and 20b are inserted through the reel shaft insertion holes 11a and 11b into the interior of the tape cassette 1 and engage with the reels 3a and 3b. At the same time, the capstan shaft 21 is inserted into the capstan shaft insertion hole 8a. Then, when the tape recorder is played, the pinch roller 23 is inserted through the pinch roller insertion hole 10a into the interior of the tape cassette 1 to clamp the tape 2 against the capstan shaft 21 so that the pinch roller cooperates with the capstan shaft 21 rotating at a constant speed to move the tape 2 at a constant speed. At the same time, the magnetic head 24 is inserted through the magnetic head insertion hole 12 into the interior of the cassette case 1 to clamp the tape 2 against the pressure pad 7 to thereby reproduce the information recorded on the tape 2.

In the thus described play condition, the reel shaft 20a serves to take up the tape 2 and is driven by a drive source (not shown), whereas the reel shaft 20b serves to feed the tape 2 and is not driven by the source, but instead the reel shaft 20b is adapted to apply a constant back tension to the tape 2.

The reel shaft 20b on the supply side of conventional construction is shown in FIGS. 5 and 6, wherein the character C denotes a chassis of the cassette tape recorder, from which an upright shaft $20b_1$ extends vertically. A reel shaft member $20B_2$ having a regular hexagonal cross section is freely rotatably mounted on the upright shaft $20b_1$. A cylindrical hub $20b_3$ surrounds the shaft $20b_2$ so as to be slidable in the axial direction but to positively engage with the shaft member $20b_2$ with respect to the horizontal or rotational direction. The cylindrical hub $20b_3$ is biased to move in one direction by a spring $20b_4$ interposed between the bottom surface of the hub and the facing portion of the shaft member $20b_2$. The hub $20b_3$ is held at a position shown by a retaining member $20b_5$ tightly engaged with the shaft member $20b_2$.

As described above, the shaft member $20b_2$, the cylindrical hub $20b_3$, the spring $20b_4$ and the retaining member $20b_5$ are formed in a unit which is prevented from being pulled apart from the upright shaft $20b_1$ by means of a stopping member $20b_6$ mounted on the top end of the upright shaft $20b_1$, as shown in FIG. 5. A leaf spring $20b_7$ interposed between a flanged portion of the upright shaft $20b_1$ and the shaft member $20b_2$ is provided in order to produce a constant frictional force between the reel shaft unit and the upright shaft $20b_1$ to thereby apply a back tension to the tape 2. With the thus constructed reel shaft 20b, when the tape cassette is inserted, if the reel lips 3b' of the cassette are not properly meshed with the outer projections $20b'_3$ of the cylindrical hub $20b_3$, the cylindrical hub $20b_3$ may be pressed downwardly so that no damage occurs. If a simpler construction is desired, as shown in FIG. 7, projections $20b'_2$ may be formed directly on the shaft member $20b_2$ with the shaft member rotatably mounted on the upright shaft $20b_1$. The leaf spring $20b_7$ provides back tension and is also provided with somewhat more bending range.

Now, when the above-described tape recorder is in the play condition, let us assume that an up-and-down vibration is applied thereto as shown by the arrow in FIG. 4. When the frequency of vibration is very low, e.g. about 1 Hz, the reels 3a and 3b are vibrated together with the case 1 and chassis C. However, when the frequency is increased, the reels 3a and 3b may remain relatively stationary while only the case 1 vibrates vertically together with the chassis C. For this reason, the upper and lower inner walls of the case 1 collide against the reels 3a and 3b with high energy. In such a condition, the tape 2 may be elongated or shortened between the point a on the tape 2 clamped between the capstan shaft 21 and the pinch roller 23 and the point b at the winding end of the reel 3b.

It is to be noted that the tape 2 between the above described points a and b has a resonance at a resonance frequency $f_O$ which is determined according to the spring constant of the tape 2 and the inertial moment of the tape wound on the reel 3b. Now, when the value of $f_O$ is calculated with a typical back tension of 2 to 3g, a value of $f_O = 30$–$40$ Hz, is derived.

When the cassette tape recorder is in its play condition, as shown in FIG. 8a, the projections 3b' of the supply reel 3b are engaged with the projections 20b'₃ of the reel shaft 20b so that the projections 3b' rotate the reel shaft 20b while the supply reel is rotated in the direction of the arrow. However, when the above noted resonance is generated, the rotation of the reel 3b may be stopped by the elongation of the tape 2 as shown in FIG. 8b. Thereafter, due to the reduction of the tape, the reel 3b is rapidly rotated to thereby rotate the reel shaft 20b with high energy and at a higher speed as shown in FIG. 8c. For this reason, a reactive force occurs whereby the shaft projections 20b'₃ push back on the reel projections 3b' so that, with the next elongation of the tape 2, the projections 3b' and 20b'₃ of both members are separated from each other as shown in FIG. 8d. Once such a state is generated, collision and reaction are alternately generated between the projections 3b' and 20b'₃ to thereby cause a so-called jitter. As a result, the travelling speed of the tape 2 on the surface of the magnetic head 24 is changed, which causes wow to be generated at about 40 Hz.

SUMMARY OF THE INVENTION

Accordingly, it is an object of this invention to provide a cassette tape machine which is substantially imune to wow induced by vertical machine vibration.

Briefly, this is achieved by providing first and second heads for contacting the tape depending upon the direction of tape travel, and an additional roller for contacting the tape in the vicinity of the cassette center. Depending on which pinch roller is engaged, the magnetic heads are moved into contact with the tape in such a manner that the contact area between the head and tape will always be isolated from the supply reel by a roller.

BRIEF DESCRIPTION OF THE DRAWINGS

In the drawings:

FIG. 1 is a graph showing the wow characteristics of a prior art cassette tape recorder before auditory compensation;

FIG. 2 is a graph showing the wow characteristics after auditory compensation of the cassette tape recorder used in FIG. 1;

DETAILED DESCRIPTION OF THE INVENTION

Figure 3:
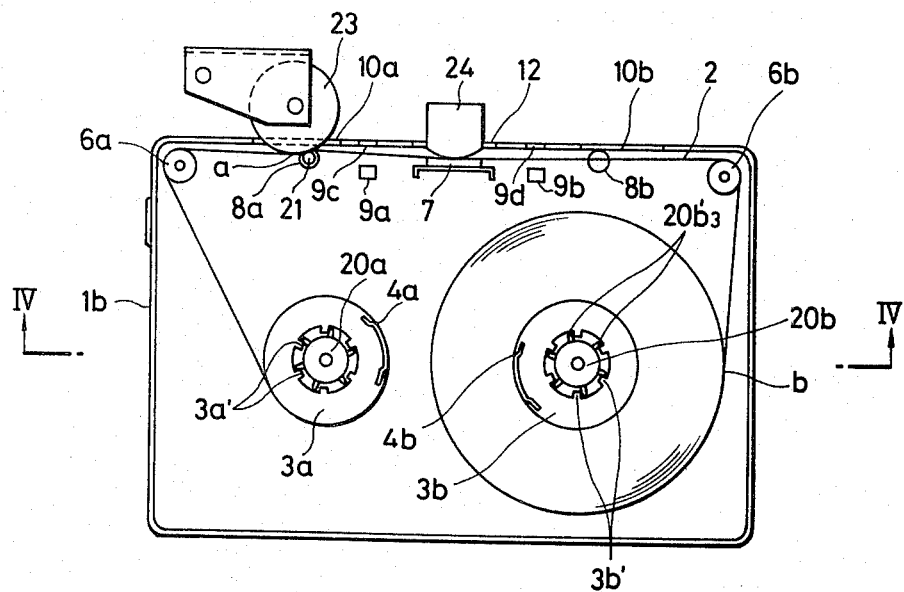
FIG. 3 is a plan view showing a prior art cassette and recorder as tested in FIGS. 1 and 2, from which an upper half is removed.
Figure 4:
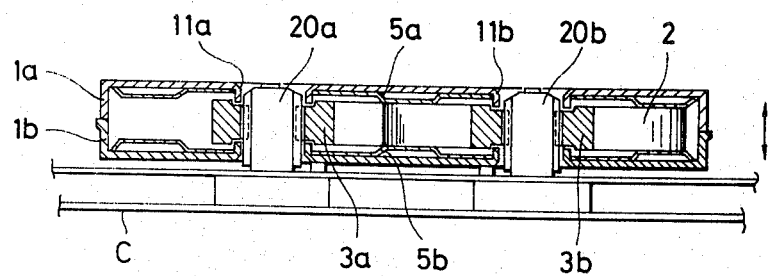
FIG. 4 is a cross sectional view of the cassette tape recorder and the cassette case taken along the line IV—IV of FIG. 3.
Figure 5:
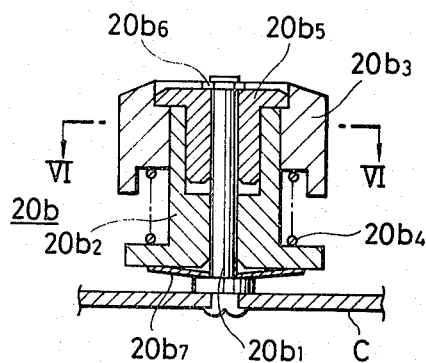
FIG. 5 is a cross sectional view showing a conventional tape supply reel shaft.
Figure 6:
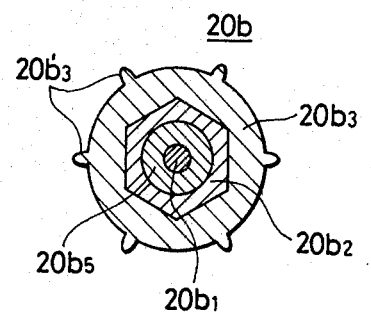
FIG. 6 is a cross sectional view of the reel shaft taken along the line VI—VI of FIG. 5.
Figure 7:
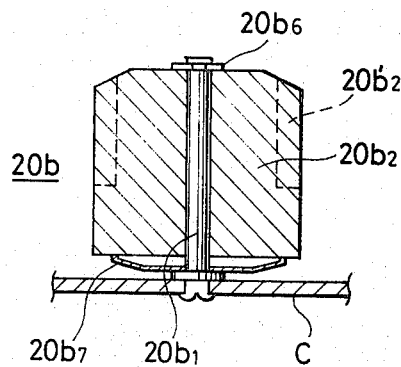
FIG. 7 is a cross sectional view showing another conventional tape supply reel shaft.
Figure 8:
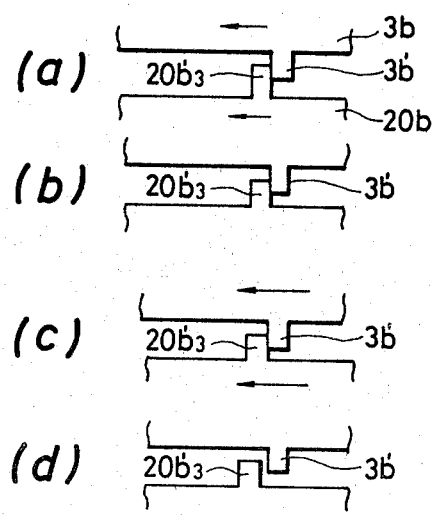
FIGS. 8a to 8d illustrate a resonance problem caused in the conventional tape supply reel shafts.

The present invention will now be described in detail with reference to FIGS. 9 to 12, in which the same reference characters used in FIGS. 3 to 8 are used to denote the like components or members.

Figure 9:
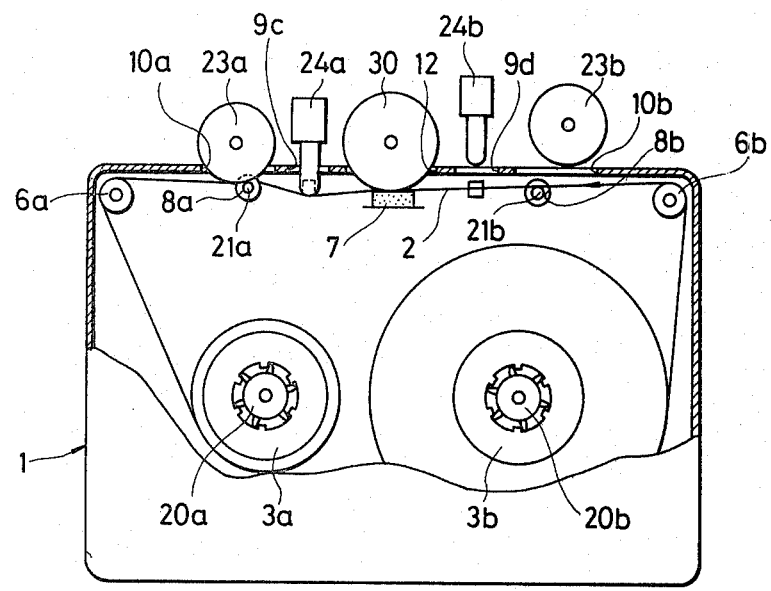
FIG. 9 is a plan cut away view in part showing a device according to the present invention.
Figure 10:
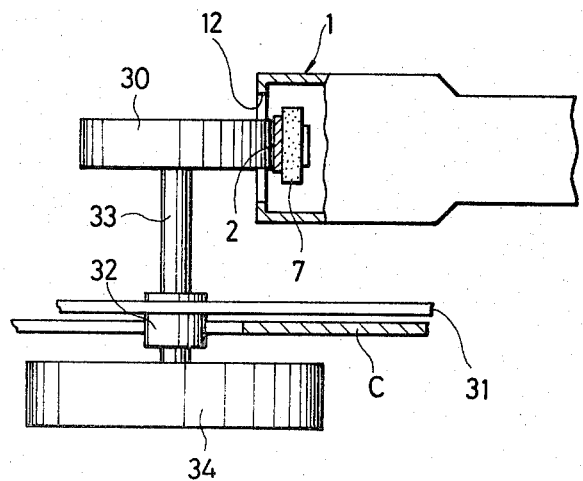
FIG. 10 is an enlarged side view of a portion of the apparatus shown in FIG. 9.

FIGS. 9 and 10 show a bidirectional cassette tape recorder in which a tape 2 is allowed to travel in either direction. The tape recorder includes a pair of capstan shafts 21a and 21b, a pair of pinch rollers 23a and 23b, and a pair of recording signal reproducing heads 24a and 24b as well as a central roller 50. The capstan shafts 21a and 21b are inserted into insertion holes 8a and 8b, and one of the pinch rollers 23a and 23b is suitably inserted into a pinch roller insertion hole 10a or 10b according to the travelling direction of the tape 2. In the embodiment shown, the pinch roller 23a is in contact with the capstan shaft 21a while clamping the tape 2 therebetween, so that the tape 2 travels in the direction indicated by the arrow at a constant speed. In this state, the reel shaft unit 20a is used as a take-up reel and the reel shaft unit 20b is used as a tape supply reel.

With respect to the pair of magnetic heads 24a and 24b, one of heads 24a, 24b depending on the tape travelling direction, is inserted through a corresponding one of the small openings 9c and 9d which are formed between the capstan insertion hole 10a, 10b and the magnetic head insertion hole 12. In the embodiment shown, the magnetic head 24a is inserted through the small openings 9c between the magnetic head insertion hole 12 and the pinch roller insertion hole 10a through which the pinch roller 23a is in the intimate contact with the capstan shaft 21a, so that the contacting surface of the magnetic head 24a is maintained in contact with the tape 2.

When either the magnetic head 24a or 24b is inserted into the above described small openings 9c and 9d, a roller 30 is adapted to clamp the tape 2 against a pressure pad 7 so that the roller 30 may be rotated together with the travelling tape 2. The roller 30 is made of material such as stainless steel or ceramic and has a thickness equal to or somewhat smaller than the width of the tape 2. The roller 30 is fixed to one end of a rotary shaft 33 which is freely rotatably supported to the cassette C by a bearing 32 such as a ball bearing. A fly wheel 34 is coupled to the other end of the rotary shaft 33 in order to stabilize the rotation of the roller 30.

Incidentally, in an ordinary cassette case, the small openings 9c and 9d are formed in order to align the cassette at a suitable position in the horizontal direction, and the openings are not generally utilized. Therefore, according to the present invention, the magnetic heads 34a and 24b are inserted into these available openings, and the roller 30 is inserted through the magnetic head insertion hole 13 which is formed for the conventional insertion of the magnetic head.

With such a construction, as described above, the parts of the tape 2 contacting with the magnetic heads 24a and 24b may be isolated from other part of the tape by the pinch roller 23a and 23b and the roller 30. For this reason, even if vertical vibration is applied to the tape recorder so that the reel 3b on the tape supply side is vibrated vertically within the cassette case 1, whereupon a resonance is generated in the tape 2 and a jitter is generated between the reel 3b and the reel shaft 20b, the speed of the portion of the tape 2 travelling in contact with the contact surface of the magnetic head will not be affected, thereby preventing the generation of wow.

Figure 11:
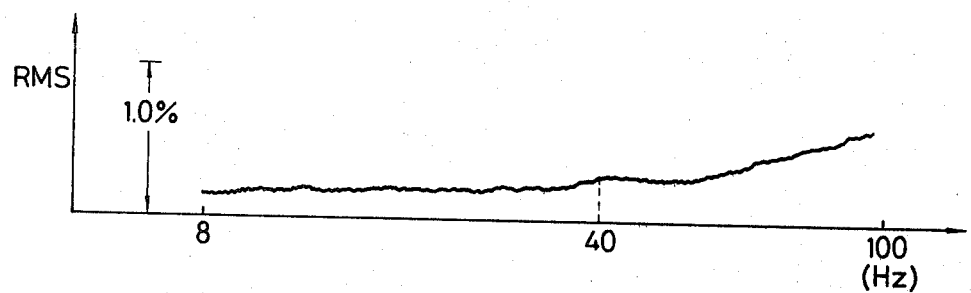
FIGS. 11 and 12 are graphs showing the wow characteristics of the device according to the present invention before and after the auditory compensation, respectively.
Figure 12:
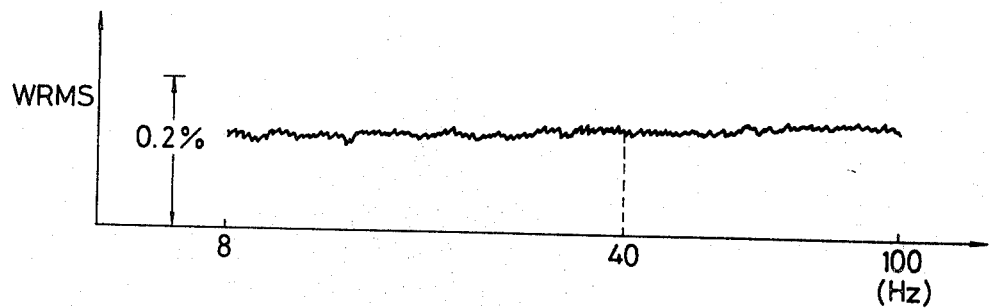

With respect to the above described embodiment, the wow characteristics were measured by applying a vertical vibration of 1 G, and the results are shown in FIGS. 11 and 12. Over the total range, wow was smaller than 1% and 0.2% before the auditory compensation and after the auditory compensation, respectively.

What is claimed is:

1. In a cassette tape machine including at least one pinch roller for engaging a tape in a cassette, having a supply reel, a take-up reel and associated guide rollers, so as to advance said tape from said supply reel to said takeup reel, said machine further comprising a magnetic head for contacting said tape, the improvement comprising an additional roller insertable from said tape machine into said cassette for contacting said tape at a point between said magnetic head and one of said associated guide rollers.

2. A cassette tape machine as claimed in claim 1, wherein said additional roller contacts said tape at substantially a central portion of said cassette.

3. A cassette tape machine as claimed in claim 2, said machine being able to transport said tape in a first direction and in a second direction which is opposite to said first direction and wherein said machine includes two pinch rollers one of which contacts said tape when said tape is transported in said first direction and the other of which contacts said tape when said tape is transported in said second direction, and two magnetic heads one between said additional roller and each of said pinch rollers, said additional roller contacting said tape when said tape is transported in either said first or second directions, and wherein the magnetic head between said additional roller and said one pinch roller contacting said tape is insertable into said cassette to contact said tape.

4. A cassette tape machine as claimed in claim 2 or 3, wherein said additional roller contacts said tape through a conventional magnetic head insertion hole in said cassette.

5. A cassette tape machine as claimed in claims 2 or 3, further comprising a rotatable shaft on which said additional roller is mounted at one end, and a flywheel coupled to the other end of said rotatable shaft.

* * * * *